UNITED STATES PATENT OFFICE.

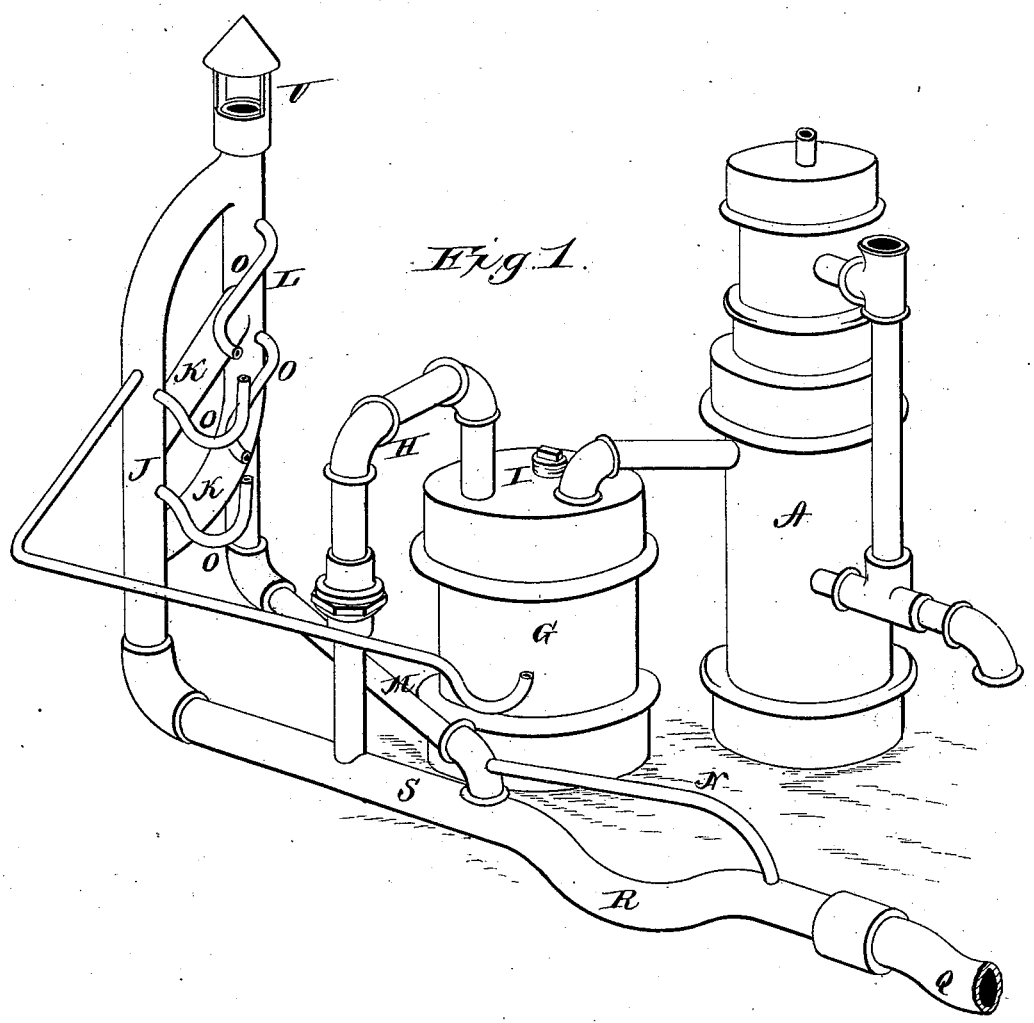

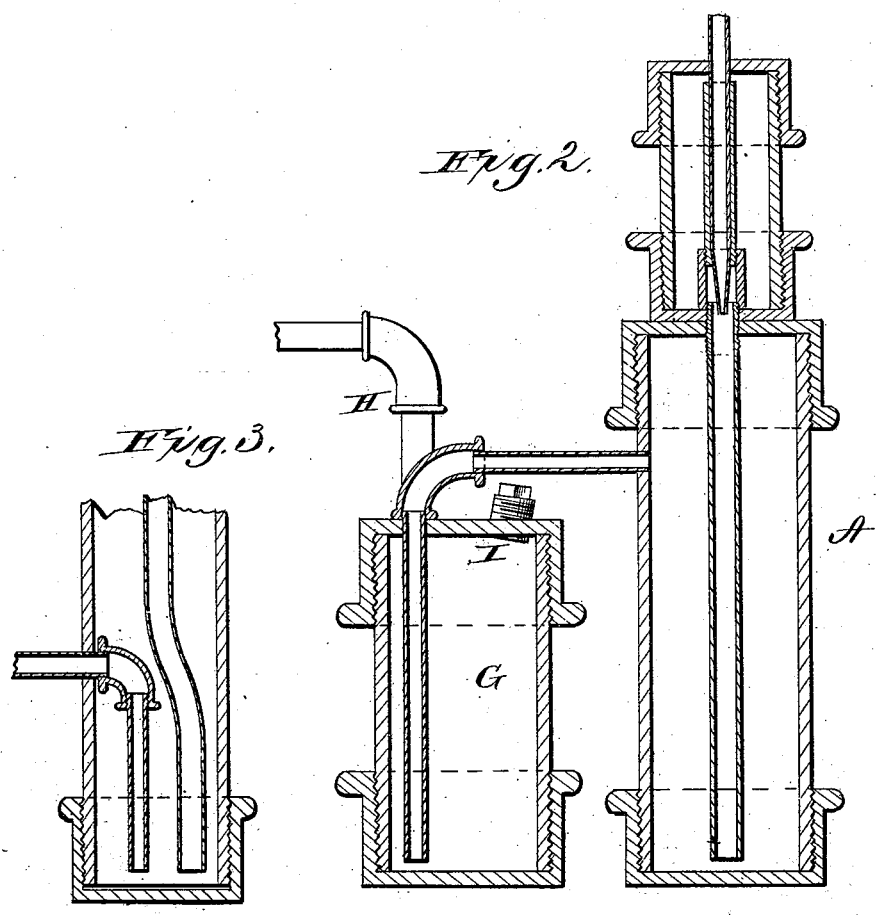

RICHARD WILSDON, OF TOLEDO, OHIO, ASSIGNOR OF ONE-HALF OF HIS RIGHT TO JOHN S. HARBECK, JR., OF SAME PLACE.

PURIFYING AND VENTILATING WASTE-PIPES, &c.

SPECIFICATION forming part of Letters Patent No. 226,579, dated April 13, 1880.

Application filed December 2, 1879.

*To all whom it may concern:*

Be it known that I, RICHARD WILSDON, of Toledo, in the county of Lucas, and in the State of Ohio, have invented certain new and useful improvements in purifying all gases and foul air in tile drains, slop, soil, and waste pipes, and a dry-pipe for draft-pipes in buildings; and I do hereby declare that the following is a full, clear, and exact description thereof, reference being had to the accompanying drawings, and to the letters of reference marked thereon, making a part of this specification.

The nature of my invention consists in purifying and ventilating tile drain, slop, soil, and waste pipes by a pressure of disinfected air, as will be hereinafter more fully set forth.

In the annexed drawings, Figure 1 is a perspective view of the apparatus used. Figs. 2 and 3 are detailed sections of parts thereof.

My present invention is intended to be used with the air compressing and purifying apparatus for which Letters Patent No. 202,083 were granted to me April 2, 1878.

A represents the hydraulic air-compressor, substantially the same as described in said patent. A column of air is forced by means of said apparatus into the agitator G, the pipe reaching to the bottom of the agitator and passing through a solution of disinfectants, and the air then passes through a pipe, H, to the sewer-pipe S, for the purpose of purifying and killing all foul air accumulated in the sewer, slop, and waste pipes.

The pipe H is connected with the top of the agitator and conducts the disinfectants to the drain S.

I is an opening in the agitator for filling the same with disinfectants. J is a soil or slop pipe connecting the drain S with the dry-draft pipe L above all waste-water connections on the soil or slop pipe.

K K are branches running at an angle from the soil or slop pipe to the dry-draft pipe L. There should be one of these placed in each story where there is a waste-water pipe connected with the slop-pipe. The water falling from above into the slop-pipe J causes the air to be carried into the dry-draft pipe L, as the water will not drive the air through the traps or seals, but into the branches, and it is from them carried into the draft-pipe and up through the roof. The vacuum caused by this water leaving said pipes will be replaced by disinfected air which is furnished by the air-compressor passing through chemicals or disinfectants in the agitator, and furnishing a column of disinfected air that naturally causes a draft and purification of the entire drain, waste, slop, and draft pipe in the building.

The dry-air draft-pipe connects with the soil-pipe J below the traps on the lower floors and passes through the roof of the building. The pipe being perfectly dry causes a natural draft, as there passes a constant current of purified air from the air apparatus.

M is a dry-air pipe leading from the tile drain S to the main dry-air pipe L, to prevent the pressure of air or gas in the drain or in the trap R. N is an escape-gas pipe leading from between the traps Q R to the branch dry-draft pipe M, as a relief for gases if forced through the trap Q to protect the trap R.

O O represent traps or connections on different floors. P is a small draft-pipe which is to connect the dry-draft pipe L with the water-closet in such a manner as to take foul air from between the pan and seat.

If there is more than one connection in one story of the building for wash-stand, bath-tub, slop-sink, &c., the trap should be as close to the wash-stand, &c., as possible, and connected with the slop-pipe of the building. By letting water into a small waste-pipe having a free deposit the water will force the air into the main slop-pipe, and the air then carried by the dry-draft pipe, and as soon as the water has passed out of the small waste-pipe said pipe will receive disinfectants from the soil-pipe to replace the vacuum.

U is a cap or protector on top of main draft-pipe or roof over the building.

Having thus fully described my invention, what I claim as new, and desire to secure by Letters Patent, is—

1. In a system for ventilating drain-pipes, &c., in a building, an agitator containing disinfectants, through which a current of air is forced, and then passes through the various pipes into a dry-air draft-pipe extending up through the building, substantially as herein set forth.

2. The combination of the drain S, soil-pipe J, dry-air draft-pipe L, branches K, connections O, and the pipe H, leading from the agitator to the drain, substantially as and for the purposes herein set forth.

3. The connecting-pipes M and N, in combination with the draft-pipe L, and the drain S, having traps Q and R, substantially as and for the purposes herein set forth.

In testimony that I claim the foregoing I have hereunto set my hand this 27th day of October, 1879.

RICHARD WILSDON.

Witnesses:
   V. BROWN,
   GEO. A. FISHER.